United States Patent
Maxik et al.

(10) Patent No.: US 10,271,533 B2
(45) Date of Patent: Apr. 30, 2019

(54) SMART MOSQUITO TRAP

(71) Applicant: Lighting Science Group Corporation, Cocoa Beach, FL (US)

(72) Inventors: Fredric S. Maxik, Cocoa Beach, FL (US); Theodore Scone, Satellite Beach, FL (US); David E. Bartine, Cocoa, FL (US); Addy S. Widjaja, Palm Bay, FL (US); Anthony Crawford, Palm Bay, FL (US)

(73) Assignee: Lighting Science Group Corporation, West Warwick, RI (US)

( * ) Notice: Subject to any disclaimer, the term of this patent is extended or adjusted under 35 U.S.C. 154(b) by 0 days.

(21) Appl. No.: 15/412,155

(22) Filed: Jan. 23, 2017

(65) Prior Publication Data

US 2018/0206472 A1    Jul. 26, 2018

(51) Int. Cl.
*A01M 1/02* (2006.01)
*A01M 1/06* (2006.01)
*A01M 1/08* (2006.01)
*A01M 1/10* (2006.01)

(52) U.S. Cl.
CPC ............ *A01M 1/023* (2013.01); *A01M 1/026* (2013.01); *A01M 1/06* (2013.01); *A01M 1/08* (2013.01); *A01M 1/106* (2013.01)

(58) Field of Classification Search
CPC ........ A01M 1/026; A01M 1/023; A01M 1/06; A01M 1/08; A01M 1/106
See application file for complete search history.

(56) References Cited

U.S. PATENT DOCUMENTS

| | | | |
|---|---|---|---|
| 5,222,322 A * | 6/1993 | Mastromonaco | A01M 1/06 43/139 |
| 6,134,826 A | 10/2000 | Mah | |
| 7,286,056 B2 * | 10/2007 | Kates | A01M 31/002 250/221 |
| 7,441,368 B1 * | 10/2008 | Rieger | A01M 1/026 43/139 |
| 7,921,594 B2 * | 4/2011 | Ropiak | A01M 1/023 43/107 |
| 2002/0121045 A1 * | 9/2002 | Hall | A01M 1/02 43/107 |
| 2004/0020100 A1 * | 2/2004 | O'Brien | A01M 23/18 43/1 |
| 2004/0093190 A1 * | 5/2004 | Beroza | A01M 1/026 702/189 |
| 2005/0126068 A1 * | 6/2005 | Welch | A01M 1/02 43/112 |
| 2006/0077663 A1 * | 4/2006 | De Ginto | A01M 29/10 362/276 |
| 2006/0254522 A1 * | 11/2006 | Shaw | A01K 29/005 119/6.5 |
| 2007/0011940 A1 * | 1/2007 | Chen | A01M 1/02 43/113 |

(Continued)

*Primary Examiner* — Magdalena Topolski
(74) *Attorney, Agent, or Firm* — Mark Malek; Widerman Malek, PL (57) ABSTRACT

A system for luring pests including a pest detector and a pest lure. The pest detector may be adapted to generate a type detection signal having a value indicative of a type of a pest in proximity to the pest detector. The pest lure may be in electrical communication with the pest detector and adapted to activate responsive to the type detection signal.

17 Claims, 3 Drawing Sheets

(56) References Cited

U.S. PATENT DOCUMENTS

| | | | |
|---|---|---|---|
| 2007/0206375 A1* | 9/2007 | Piepgras | A43B 1/0027 362/147 |
| 2007/0242566 A1* | 10/2007 | Hsu | A01M 1/026 367/139 |
| 2010/0286803 A1* | 11/2010 | Tillotson | A01M 1/026 700/94 |
| 2011/0030266 A1* | 2/2011 | Roy | A01M 1/08 43/113 |
| 2014/0165452 A1* | 6/2014 | Rocha | A01M 1/08 43/113 |
| 2014/0169138 A1* | 6/2014 | Lee | A01M 29/18 367/139 |
| 2014/0250767 A1* | 9/2014 | Heugle | A01M 1/026 43/129 |
| 2015/0040466 A1* | 2/2015 | Bolen | A01M 1/02 43/144 |
| 2015/0085100 A1* | 3/2015 | Raschella | A01M 31/002 348/82 |
| 2016/0127694 A1* | 5/2016 | Chang | A01M 23/16 348/143 |
| 2016/0245916 A1* | 8/2016 | Weber-Grabau | H01J 37/32917 |
| 2017/0035039 A1* | 2/2017 | Sandford | A01M 1/023 |
| 2017/0094960 A1* | 4/2017 | Sasaki | H02S 40/38 |
| 2017/0164597 A1* | 6/2017 | Brown | A01M 1/026 |

* cited by examiner

SMART MOSQUITO TRAP

FIELD OF THE INVENTION

The present invention relates to systems and methods for collecting and eliminating flying pests. More specifically, the invention is directed to a system and method for detecting and luring pests to an irradiation device.

BACKGROUND

Conventional zapper-type devices have been used for some time in outdoor settings. Typically the device includes a light for attracting the bugs to a very high voltage grid system. The insects typically run into the grid while flying around the light and quickly and unexpectedly encounter a high voltage charge. When the insect makes contact between two of the electrodes of the grid, the insect experiences the sudden onslaught of current and heat. The insect is both boiled by the heating of his bodily juices and burned where there is no fluid to boil. This results in a "zap" sound which ranges from a loud pop to a pop and sizzle sound. The device is predominantly used outside because (1) a high voltage source and grids are exposed and the device has to be mounted high enough that passersby would not normally be able nor tempted to touch it, (2) high voltage exposed grids may constitute a fire hazard if used inside, (3) the insects which are electrocuted either fall to the ground or in some cases burst into a flame with the accompanying smoke, (4) the noise level produced during operation would not be consistent with in-home use, and (5) the high voltage and current of the high voltage source, and the periodic drain on current would combine to cause significant interference if used near an appliance.

Of course, other types of insect trapping mechanisms are also commonly in use, including adhesive strips, fly paper, and the like. These structures usually include a sweetened scent which may also attract other insects such as ants and roaches. In addition, not all insects are attracted to sweet scents, such as mosquitoes. Most of the sticky media or glue traps involve having to periodically change out the sticky material by disposing of it and purchasing more for reinstallation. In normal use, the need to change the material occurs where large numbers of insects cover the sticky surface so that other insects have no place to stick, or where the scent material has completely evaporated. So, when there is a high insect density, the sticky media traps may be used up much more rapidly than they can be replaced, and in low density areas, the sticky media is likely to be left hanging in place much longer than its ability to attract insects. Some devices use water to drown insects, but this too is messy and invites aquatic bacteria and vermin.

What is therefore need is an insect trap which is safe, quiet, and attracts only the target pest. The needed flying insect trap would be sanitary and it could be used for long periods of time with low maintenance. The needed insect trap should work well in areas of high insect density as well as areas of low insect density. The disposal of the collected and killed insects should be had in an environmentally sound manner to eliminate having to generate paper and plastic waste in addition to the disposal of the bio-degradable insect remains.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a system for luring pests including a pest detector and a pest lure. The pest detector may be adapted to generate a type detection signal having a value indicative of a type of a pest in proximity to the pest detector. The pest lure may be in electrical communication with the pest detector and adapted to activate responsive to the type detection signal.

The system may also include a solar panel and a battery. The battery may be in electrical communication with the solar panel, pest detector, and pest lure.

The system may include a processor in electrical communication with the pest detector and the pest lure. The processor may be adapted to control the pest lure responsive to input received from the pest detector. The processor may be further adapted to quantify power consumed by the system.

The system may include a pest disabler in electronic communication with the processor. The processor may be adapted to quantify a number of pests targeted by the pest disabler.

The system may include a thermal pipe adapted to provide an electrical signal indicative of ambient temperature of a surrounding area.

The system may include a pest disabler in electronic communication with the pest detector. The pest detector may be adapted to generate a location signal indicative of a location of the pests within a target zone. The pest disabler may be further adapted to activate responsive to the location signal.

The pest disabler may include a vacuum device.

The pest disabler may include at least one electromagnetic energy emitting device and at least one positioning device. The at least one electromagnetic energy emitting device may be in electrical communication with the pest detector and adapted to emit electromagnetic energy. The at least one positioning device may be in electrical communication with the pest detector. The at least one positioning device may be adapted to carry at least one electromagnetic energy emitting device and to direct the electromagnetic energy emitted by the at least one electromagnetic energy emitting device toward the location of the pest.

The at least one electromagnetic energy emitting device may include a plurality of electromagnetic energy emitting devices. The at least one positioning device may include a plurality of positioning devices. Each of the plurality of positioning devices may be adapted to carry one of the plurality of electromagnetic energy emitting devices. Each of the plurality of positioning devices may be cooperatively adapted to direct at least one emission of electromagnetic energy along a continuous perimeter of the target zone.

The pest lure may include a frequency generator in electrical communication with the pest detector and adapted to emit a frequency associated with the type of pest.

The pest lure may include an attractant release in electrical communication with the pest detector and adapted to release an amount of carbon dioxide adapted to attract the type of pest.

The pest detector may be further adapted to generate a direction signal indicative of a position of the pest relative to the pest detector. The attractant release may be adapted to direct the release of the amount of carbon dioxide toward the position.

The attractant release may be further adapted to periodically release an amount of carbon dioxide at a release frequency associated with the type of pest.

The attractant release may include a titanium dioxide element and a light emitter in electrical communication with the pest detector. The light emitter may be adapted to irradiate the titanium dioxide element.

The pest lure may include a light emitter in electrical communication with the pest detector and adapted to at least one of generate and simulate a surface temperature based on the value of the type detection signal.

The light emitter may be adapted to emit infrared light.

DETAILED DESCRIPTION OF THE INVENTION

Figure 1:
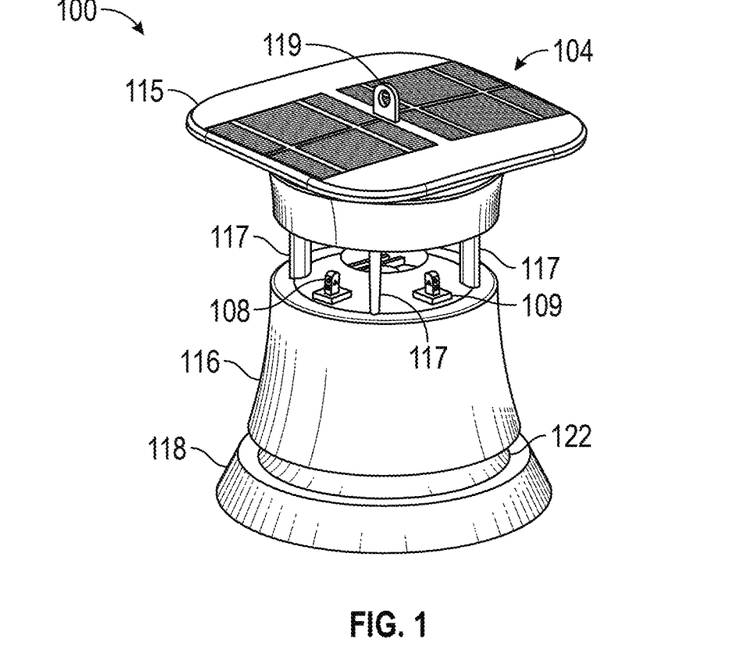
FIG. 1 is a top perspective view of a system for luring pests according to an embodiment of the present invention.
Figure 2:
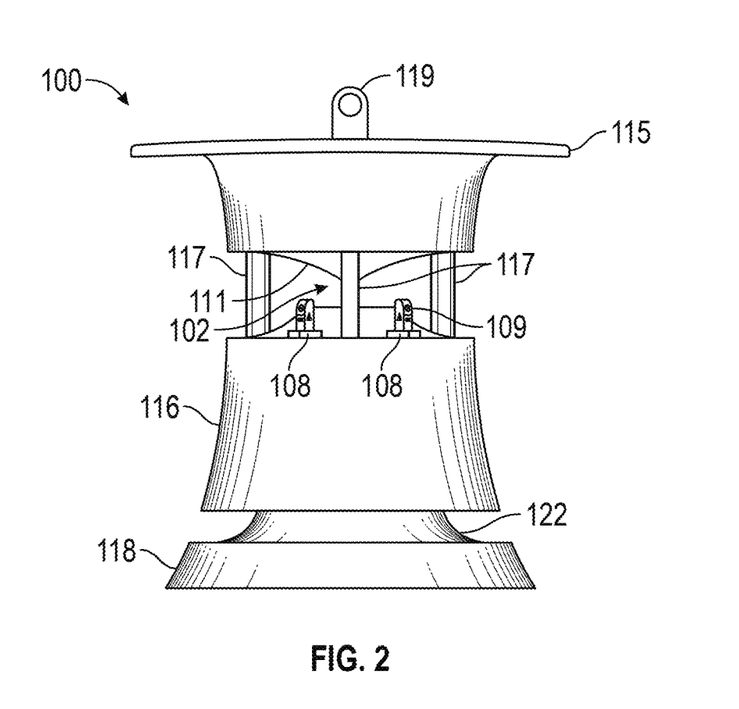
FIG. 2 is a side view of the system of FIG. 1.
Figure 3:
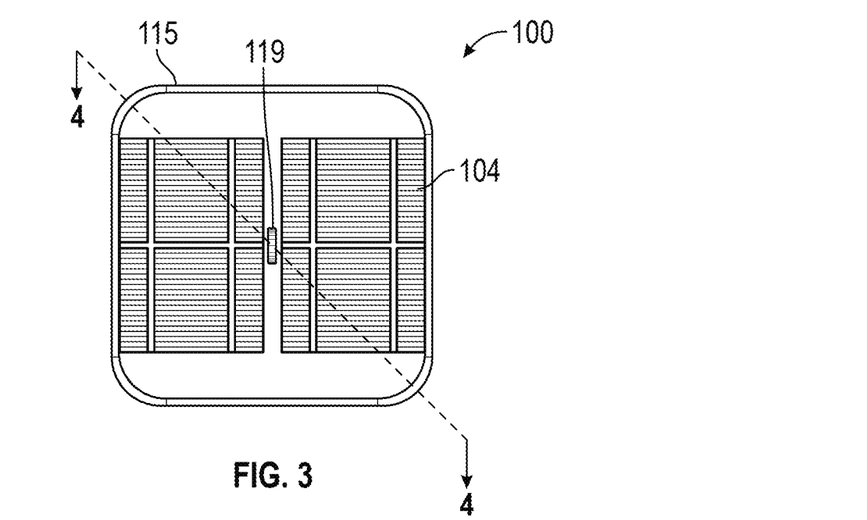
FIG. 3 is a top view of the system of FIG. 1.
Figure 4:
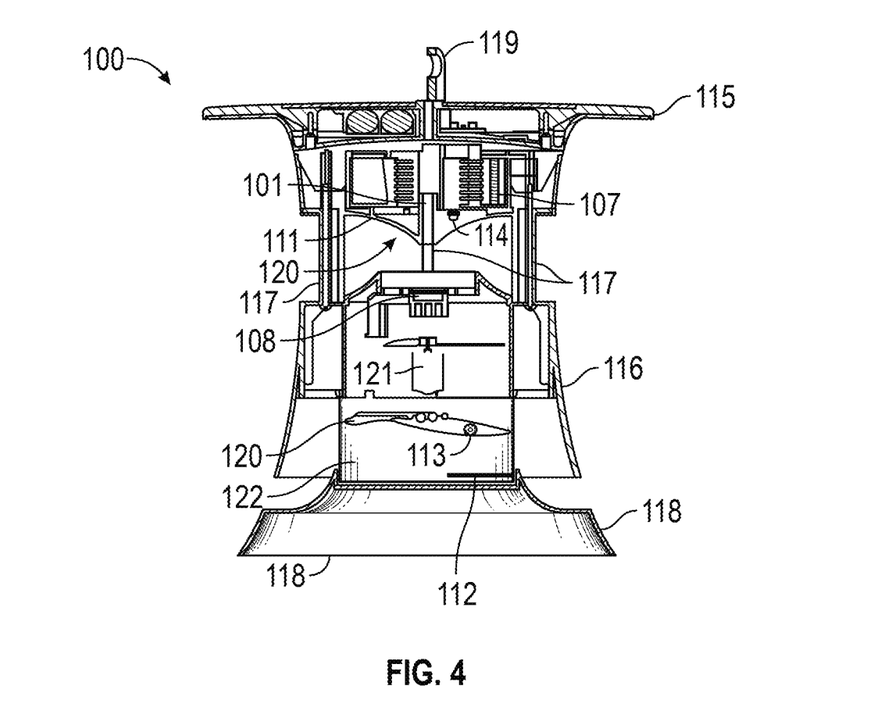
FIG. 4 is a cross-section view taken through the 4-4 line of FIG. 3.
Figure 5:
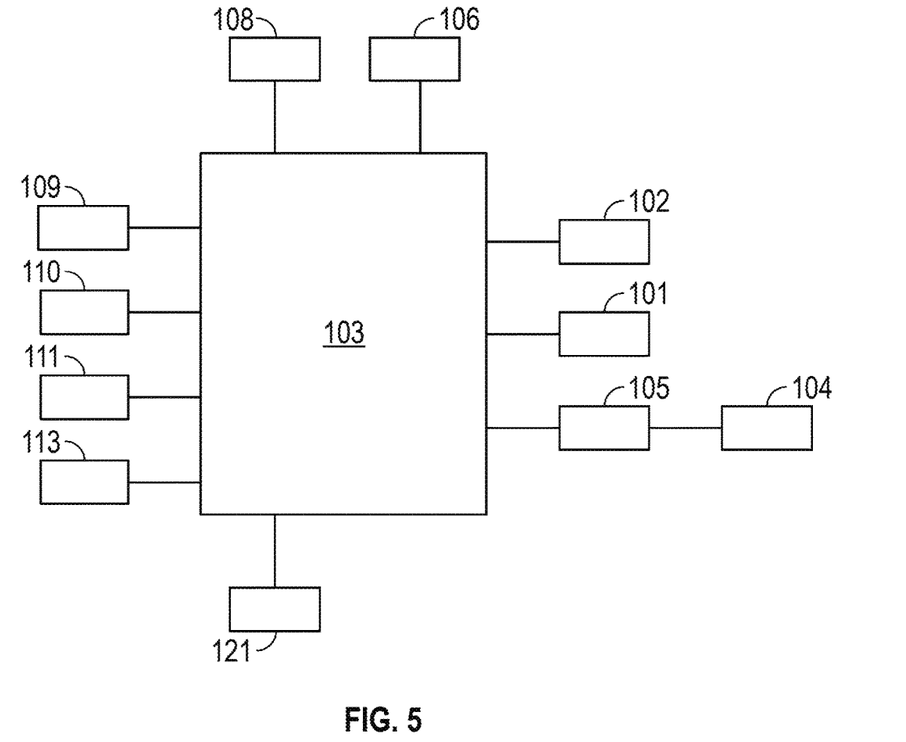
FIG. 5 is a block diagram of the system for luring pests according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a system for luring pests 100. The system 100 may include a pest detector 101 and a pest lure 102. In one embodiment, the system 100 may include a pest disabler 106. The system 100 may be adapted to identify the type of pest to be targeted by the system. The targeted pest may be a pest specified to the system 100 or may be a pest detected by the system. The system 100 may adapt the pest lure 102 or the pest disabler 106 to increase or maximize efficiency dependent upon the target pest. Such an adaptation may reduce resources utilized by the system 100. The system may be adapted to change the type of lure used to attract a pest.

The system 100 may be adapted to determine patterns and modify its operation in accordance with detected pest activity. By way of example, and not as a limitation, the system 100 may learn that a particular species of pest is present an hour before sunset. The system 100 may have information indicating the time of sunset each day and proactively adapt to lure and disable the expected pest even before its presence is detected.

The system 100 may be adapted to communicate with a network. Such communication may occur wired or wirelessly. The system 100 may have an IP address. They system 100 may provide or receive information from the network. The system may provide information to the network indicating a chamber 122 used to store disabled pests is full, the type of pest identified, the power used by the device, the number of pests identified, or the like.

The pest detector 101 may be adapted to detect a type of pest in proximity to the system 100. The pest detector 101 may generate a type detection signal having a value indicative of the type of pest detected. The type detection signal may be provided to a processor 103. The type of pest may be determined by detecting a wing beat frequency of the pest. Specific wing beat frequencies may be associated with specific pests. By way of example, and not as a limitation, one detected frequency may indicate a first species of mosquito while a second detected frequency may indicate a second species of mosquito. The pest detector 101 may include at least one microphone adapted to detect a wingbeat frequency. In one embodiment, the pest detector 101 may include a plurality of microphones, by way of example, but not as a limitation, three or four microphones, physically configured to triangulate the position of detected sound. The pest detector 101 may be adapted to perform long-range sound detection. The pest detector 101 may be capable of detecting frequencies in the range of 600-1,000 Hz. The pest detector 101 may be capable of detecting frequency within a few Hertz. In one embodiment, the pest detector 101 may be capable of detecting frequency within +/−4 Hz.

The system for luring pests 100 may include a database associating pest frequencies, type of pests, pest lure 102 parameters, or pest disabler 106 parameters. The system 100 may utilize the database to look up pest lure 102 parameters, including, but not limited to, attractant type and method of deployment, and pest disabler 106 parameters, including, but not limited to, pest disabler type.

The pest detector 101 may be adapted to determine the location of the pest relative to the pest detector 101. The pest detector 101 may be adapted to determine location by triangulation. The pest lure 102 may be in electronic communication with the pest detector 101 and receive a direction signal, generated by the pest detector 101, indicative of the position of the pest. The pest lure 102 may direct its efforts toward the position where the pest is detected. That is, carbon dioxide or frequencies may be emitted toward or directed toward the detected position.

The pest lure 102 may be in electrical communication with the pest detector 101. The pest lure 102 may be adapted to activate responsive to the type detection signal. The pest lure 102 may be adapted to attract a pest to the system 100 upon detection of one or more pest. The method of attraction may vary based upon the type of pest detected. By way of example, and not as a limitation, the attractant may be odor, sound, or light. Each attractant may be altered to appeal to the target pest. Attractants may be altered to appeal to characteristics of a type of pest, including, but not limited to, gender, species, time of day, feeding behavior, or the like. In embodiments in which the attractant may be carbon dioxide, the amount of carbon dioxide or the frequency of release may be altered. In embodiments in which the attractant is sound, the frequency of the sound generated may be altered. In embodiments in which the attractant is light, the temperature of the emitted light may be altered to simulate heat of different animals.

By way of example, and not of limitation, the pest lure 102 may include an attractant release 111 adapted to emit a first amount of carbon dioxide when a first pest is detected. The pest lure 102 may be adapted to emit a second amount of carbon dioxide when a second type of pest is detected. The attractant release 111 may be in electrical communication with the pest detector 101 and the amount of carbon dioxide released may be associated with a type of pest. The pest lure 102 may release the amount of carbon dioxide associated with a type of pest detected by the pest detector 101. The amount of carbon dioxide associated with a type of pest may be an amount of carbon dioxide known to attract the type of pest. The amount of carbon dioxide may be periodically released at a release frequency rate. The release frequency rate may be fixed or selectable. The release frequency rate may be associated with a type of pest. The release frequency rate at which an amount of carbon dioxide is released may be a frequency that is known to attract the type of pest. The release frequency rate may simulate breathing rates of one or more animals, including humans.

The attractant release 111 may be adapted to emit 12-30 bursts of carbon dioxide per minute. Such a configuration may simulate human breathing patterns. The attractant release 111 may be adapted to direct the emission of gas in a specified direction. In one embodiment, each burst of carbon dioxide released may contain 0.8 L of gas, of which carbon dioxide may be 4% of the volume. Each burst of carbon dioxide may contain between 1.0 and 0.6 L of gas, with carbon dioxide composing 4% of the volume.

The attractant release 111 may include a titanium dioxide element 112 and a light emitter 113. The light emitter 113 may be positioned and adapted to irradiate the titanium dioxide element 112. The irradiation of the titanium dioxide element 112 may result in the creation of carbon dioxide. Pests that have been disabled by the pest disabler 106 may accumulate in an area capable of being irradiated by the light emitter 113. Irradiation of the disabled pests may create carbon dioxide, which may be released or utilized by the pest lure 102.

The pest lure 102 may include a frequency generator 110, which may be in electrical communication with the pest detector 101. The frequency generator 110 may be adapted to emit one or more frequencies. One or more frequencies may be associated with a type of pest. The frequency generator 110 may emit a frequency associated with a type of pest detected by the pest detector 101. The frequency associated with a type of pest may be a frequency that is known to attract the type of pest. By way of example, and not as a limitation, the frequency may be the wing beat rate of a potential mate or a frequency in the range of human voices.

The pest lure 102 may include a light emitter 114, which may be in electrical communication with the pest detector 101. The light emitter 114 may be adapted to generate a temperature to simulate a surface temperature. The light emitter 114 may be adapted to generate a plurality of temperatures. A temperature may be associated with a type of pest. The temperature may be a body surface temperature of an animal, including a human, to which the type of pest may be attracted. The light emitter 114 may be adapted to emit infrared light.

The pest lure 102 may be adapted to generate heat simulating the surface temperature of a human and may be adapted to emit carbon dioxide in a manner simulating human breathing. The pest lure 102 may be adapted to generate heat or emit carbon dioxide in a manner that may be more attractive to a pest than an actual human.

The system 100 may also include a solar panel 104 and a battery 105. The battery 105 may be adapted to provide power to the entire system 100. The solar panel 104 may be adapted to charge the battery 105. The system 100 may be adapted to consume low power. The solar panel 104 may be adapted to generate energy sufficient to fully power the system 100. The battery 105 may be in electrical communication with the solar panel 104, the pest detector 101, and the pest lure 102.

A processor 103 may be in electrical communication with the pest detector 101 and the pest lure 102. The processor 103 may receive electronic data from the pest detector 101 and generate a type detection signal. The pest detector 101 may generate the type detection signal independent of the processor 103. The processor 103 may be adapted to control the pest lure 102 responsive to input received from the pest detector 101. The input received from the pest detector 101 may be considered the type detection signal.

The system 100 may further include a pest disabler 106 in electronic communication with the processor 103. The processor 103 may be adapted to quantify a number of pests targeted by the pest disabler 106. The number of pests targeted may be quantified by counting the number of times the pest disabler 106 is activated. The pest disabler 106 may be activated each time the pest detector 101 detects the pest.

The pest disabler 106 may be a vacuum device 121, including, but not limited to, a suction fan. In such an embodiment, the pest disabler 106 may create a low pressure area to draw the pest into the pest disabler 106. The pest disabler 106 may be a plurality of vacuum devices 121. Each vacuum device 121 may be independently positioned by a positioning device 109. One or more vacuum devices 121 may be positioned by a positioning device 109. The vacuum device 121 may be adapted to operate only when the pest is located within a target area proximate the vacuum device 121.

The pest disabler 106 may include an electromagnetic energy emitting device 108, which may be, by way of example, and not as a limitation, a laser diode, LED, or the like. The electromagnetic energy emitting device 108 may further include a plurality of electromagnetic energy emitting devices 108. The pest disabler 106 may include a positioning device 109 adapted to carry at least one electromagnetic energy emitting device 108. The electromagnetic energy emitting device 108 may be in electrical communication with the pest detector 101 and may be adapted to emit electromagnetic energy when a pest is detected. The positioning device 109 may move the electromagnetic energy emitting device 108, or any other portion of the pest disabler 106, to direct the disabling force toward the location of the pest. The disabling force, may be the low pressure area, the electromagnetic energy, or other force used to disable a pest.

A positioning device 109 may position an electromagnetic energy emitting device 108 independently of the position of other electromagnetic energy emitting devices 108 or may move a plurality of electromagnetic energy emitting devices 108. A plurality of positioning devices 109 may carry a plurality of electromagnetic energy emitting devices 108. A separate positioning device 109 may carry each electromagnetic energy emitting device 108. The positioning devices 109 may be cooperatively adapted to direct emission from at least one of the electromagnetic energy emitting devices 108 along a continuous perimeter of the target zone. That is, a continuous perimeter around the system for luring pests 100 may be targeted by the pest disabler 106.

The processor 103 may be adapted to quantify power consumed by the system 100. The system 100 may measure current or voltage drawn by the system 100.

The system 100 may include a thermal pipe 107. The thermal pipe may be adapted to provide an electrical signal indicative of ambient temperature of the area surrounding the system 100. The electrical signal indicative of ambient temperature may be provided to the processor 103. The ambient temperature may be utilized by the system 100 to determine time of day. The system 100 may be adapted to operate differently at different times of day. By way of example, and not as a limitation, the system 100 may be enabled to increase power or increase frequency of pest detection or disabling techniques at times when pests may be more likely to be present, such as, by way of example, and not as a limitation, around sunrise or sunset.

The pest detector 101 may be in electronic communication with the pest disabler 106. The pest detector 101 may be adapted to detect pests within a target zone. The pest detector 101 may be adapted to generate a location signal indicative of a location of pest within a target zone. The pest disabler 106 may be adapted to receive a location signal indicative of a location of pests. The pest disabler 106 may be adapted to activate responsive to the location signal. A plurality of pest disablers 106 may be used by the system 100. Each pest disabler 106 may be associated with a respective target zone. Each of the pest disablers 106 may be activated responsive to one or more location signals. A pest disabler 106 may be activated only if one or more pest detectors 101 provide a signal indicating that a pest is within a target zone of the respective pest disabler 106.

The operation of the system 100 may be adapted based on information received by the system 100. The system 100 may dynamically control the pest lure 102 or the pest disabler 106 based upon geographical location, temperature, type of pest, location of pest, presence of pest, or the like. The system 100 may receive information related to the pests disabled by the system 100 and optimize performance of the system 100 based upon this information. The system 100 may optimize its performance to disable a maximum number of pests while consuming minimum energy.

The system 100 may be adapted to operate in a low power or an external power mode. The power mode may be selectable by a user or by the system 100 itself. The system 100 may operate in low power mode when powered by solar power or a battery. The system 100 may operate in external power mode when it is receiving power from an external source, including, but not limited to an external battery, an onboard battery, an AC power supply, or the like.

The system 100 may include one or more solar panels 104 located on an upward facing portion. The upward facing portion may include an upper housing member 115. The solar panel(s) 104 may be in electrical communication with one or more batteries 105. The battery 105 may be adapted to store electrical energy to power the system 100 when other energy sources may be unavailable. The battery 105 may be located in the upper housing member 115. The pest detector 101 may be located in the upper housing member 115. The pest detector 101 may be located in a central portion of the upper housing member 115.

The upper housing member 115 may be connected to a lower housing member 116 using one or more support pillars 117. The pillars 117 may create open space between the upper housing member 115 and the lower housing member 116. The attractant release 111 may be located in the upper housing member 115 and adapted to release attractant into the open space between the upper housing member 115 and the lower housing member 116.

The pest disabler 106 may be located in the lower housing member 116. One or more electromagnetic energy emitting devices 108 may be located in the lower housing member 116. The electromagnetic energy emitting device(s) 108 may be located near an opening in the top center of the lower housing member 116 and adapted to emit electromagnetic energy outwardly from the opening in the lower housing member 116. A vacuum device 121 may be located beneath the lower housing member 116 opening and adapted to draw pests through the opening toward the vacuum device 121 or into a chamber 122. A vacuum valve 120 may be located in the lower housing member 116 and adapted to work cooperatively with the vacuum device 121 to create a low pressure area to which pests are attracted. The vacuum valve 120 may form an entryway to a chamber 122 adapted to store disabled pests. The vacuum valve 120 may allow pests to pass into the chamber 122 and prevent exit from the chamber 122.

The lower housing member 116 may have a base 118 located on a lower portion. The base 118 may be adapted to contact the ground and support the system 100 when in a floor mount configuration.

The upper housing member 115 may have a suspension hook 119 located thereon. The suspension hook 119 may be adapted to secure to a hook or other device, which may support the system 100 in a hanging configuration.

The upper housing member 115, lower housing member 116, support pillars 117, or any combination of these may be configured to amplify the sounds generated as attractant by the pest lure 102.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A system for luring pests comprising:
   a pest detector adapted to generate a type detection signal having a value indicative of a type of a pest in proximity to the pest detector and further adapted to generate a location signal indicative of a location of the pest within a target zone; and
   a pest lure in electrical communication with the pest detector and adapted to activate responsive to the type detection signal, comprising a light emitter in electrical communication with the pest detector and adapted to emit infrared light and configured to simulate different surface temperatures of various animals based on the value of the type detection signal;
   a pest disabler in electronic communication with the pest detector, the pest disabler comprising:
      at least one electromagnetic energy emitting device in electrical communication with the pest detector and adapted to emit electromagnetic energy, and
      at least one positioning device in electrical communication with the pest detector, wherein the at least one positioning device is adapted to carry the at least one electromagnetic energy emitting device and to dynamically position the at least one electromagnetic energy emitting device responsive to the location signal to direct the electromagnetic energy emitted by the at least one electromagnetic energy emitting device toward the location of the pest.

2. The system according to claim 1 further comprising:
   a solar panel; and
   a battery in electrical communication with the solar panel, the pest detector, and the pest lure.

3. The system according to claim 1 further comprising:
   a processor in electrical communication with the pest detector and the pest lure, the processor being adapted to control the pest lure responsive to an input received from the pest detector.

4. The system according to claim 3 wherein the processor is adapted to quantify a number of pests targeted by the pest disabler.

5. The system according to claim 4 wherein the processor is further adapted to quantify power consumed by the system.

6. The system according to claim 3 further comprising:
   a thermal pipe adapted to provide an electrical signal indicative of ambient temperature of a surrounding area.

7. The system according to claim 1 wherein the pest disabler comprises a vacuum device.

8. The system according to claim 1 wherein:
   the at least one electromagnetic energy emitting devices comprises a plurality of electromagnetic energy emitting devices;
   the at least one positioning device comprises a plurality of positioning devices;
   wherein each of the plurality of positioning devices is adapted to carry one of the plurality of electromagnetic energy emitting devices; and
   wherein each of the plurality of positioning devices are cooperatively adapted to direct at least one emission of electromagnetic energy from at least one of the plurality of electromagnetic energy emitting devices along a continuous perimeter of the target zone.

9. The system according to claim 1 wherein the pest lure comprises a frequency generator in electrical communication with the pest detector and adapted to emit a frequency associated with the type of pest.

10. The system according to claim 1 wherein the pest lure comprises an attractant release in electrical communication with the pest detector and adapted to release an amount of carbon dioxide adapted to attract the type of pest.

11. The system according to claim 10 wherein the pest detector is further adapted to generate a direction signal indicative of a position of the pest relative to the pest detector; and wherein the attractant release is adapted to direct the release of the amount of carbon dioxide toward the position.

12. The system according to claim 10 wherein the attractant release is further adapted to periodically release the amount of carbon dioxide at a release frequency associated with the type of pest.

13. The system according to claim 10 wherein the attractant release comprises:
   a titanium dioxide element; and
   a second light emitter in electrical communication with the pest detector and adapted to irradiate the titanium dioxide element.

14. The system according to claim 13 wherein the second light emitter is adapted to emit infrared light.

15. A system for luring pests comprising:
   a frequency detector adapted to detect a frequency of a pest wingbeat and to generate a type detection signal having a value indicative of a type of a pest in proximity to the frequency detector and further adapted to generate a location signal indicative of a location of the pest within a target zone; and
   a pest lure in electrical communication with the frequency detector and adapted to activate responsive to the type detection signal, comprising a light emitter in electrical communication with the pest detector and adapted to emit infrared light to simulate different surface temperatures of various animals based on the value of the type detection signal; and
   a pest disabler in electronic communication with the pest detector, the pest disabler comprising:
      at least one electromagnetic energy emitting device in electrical communication with the pest detector and adapted to emit electromagnetic energy, and
      at least one positioning device in electrical communication with the pest detector, wherein the at least one positioning device is adapted to carry the at least one electromagnetic energy emitting device and to dynamically position the at least one electromagnetic energy emitting device responsive to the location signal to direct the electromagnetic energy emitted by the at least one electromagnetic energy emitting device toward the location of the pest;

wherein the value of the type detection signal is determined based on the detected frequency.

16. The system according to claim 15 wherein the frequency detector comprises a plurality of frequency detectors; and wherein each of the plurality of frequency detectors comprises a microphone.

17. A system for luring pests comprising:
an upper housing member;
a lower housing member;
a pest detector adapted to generate a type detection signal having a value indicative of a type of a pest in proximity to the pest detector and further adapted to generate a location signal indicative of a location of the pest within a target zone; and
a pest lure in electrical communication with the pest detector, adapted to activate responsive to the type detection signal, the pest lure comprising:
    an attractant release located in the upper housing member in electrical communication with the pest detector and adapted to release an amount of carbon dioxide adapted to attract the type of pest into an open space between the upper housing member and the lower housing member; and
    a light emitter adapted to generate infrared light and a temperature associated with an animal;
a pest disabler in electronic communication with the pest detector, the pest disabler comprising:
    at least one electromagnetic energy emitting device in electrical communication with the pest detector and adapted to emit electromagnetic energy to irradiate the pest,
    at least one positioning device in electrical communication with the pest detector, and
    wherein the at least one positioning device is adapted to carry the at least one electromagnetic energy emitting device, and to dynamically position the at least one electromagnetic energy emitting device responsive to the location signal to direct the electromagnetic energy emitted by the at least one electromagnetic energy emitting device toward the location of the pest;
    wherein the at least one electromagnetic energy emitting device is positioned on the lower housing and configured to emit energy upward toward the upper housing;
a second light emitter in electrical communication with the pest detector and adapted to irradiate the pest previously irradiated by the electromagnetic energy emitted by the at least on electromagnetic energy emitting device;
wherein the pest disabler is further adapted to activate in response to the location signal.

* * * * *